A. HUBER.
Mirror.

No. 163,930.  Patented June 1, 1875.

WITNESSES:
E. Wolff
A. F. Terry

INVENTOR:
A. Huber
BY
Munn & Co.
ATTORNEYS.

THE GRAPHIC CO. PHOTO-LITH. 39 & 41 PARK PLACE, N.Y.

UNITED STATES PATENT OFFICE.

ALLEN HUBER, OF BERLIN, CANADA.

IMPROVEMENT IN MIRRORS.

Specification forming part of Letters Patent No. 163,930, dated June 1, 1875; application filed December 19, 1874.

*To all whom it may concern:*

Be it known that I, ALLEN HUBER, of Berlin, Province of Ontario, Canada, have invented a new and useful Improvement in Mirror-Backs, of which the following is a specification:

This invention relates to new and useful improvements applied to the backs of mirrors, whereby the liability to damage is greatly lessened; and it consists in covering the back of the mirror with varnish or water-proof material, and with a coat of gypsum, plaster-of-paris, or equivalent material.

Figure 1:
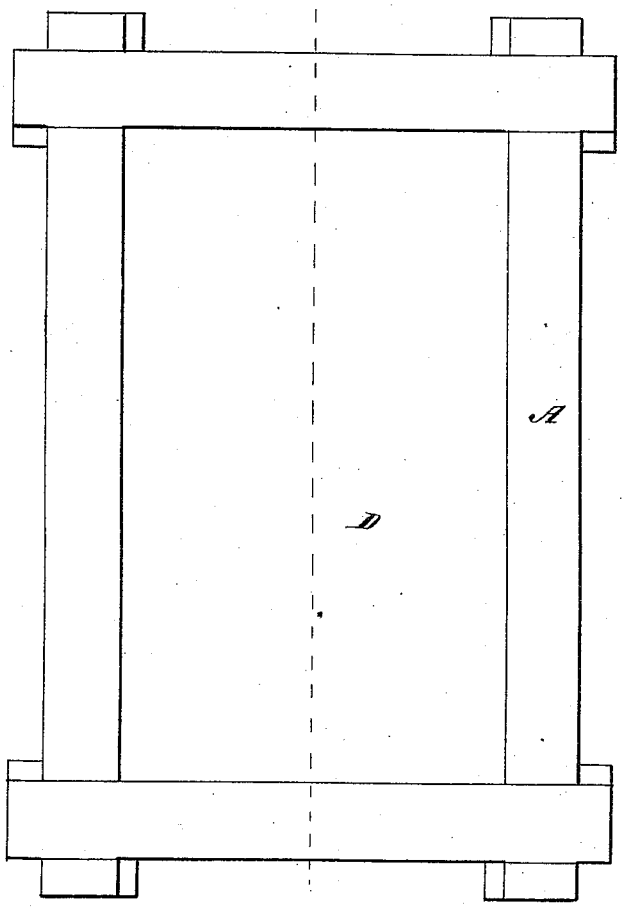
Figure 2:
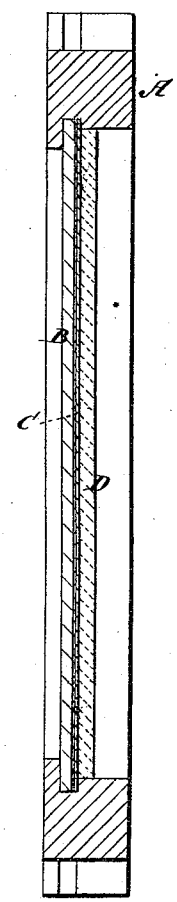

Figure 1 is a view of the back of a mirror confined in its frame; and Fig. 2 is a section of Fig. 1, taken on the line $x\ x$.

Similar letters of reference indicate corresponding parts.

A is the mirror-frame, made of any suitable material and of any style of workmanship or ornamentation. B represents the mirror, the back of which is silvered in the usual manner.

To apply my invention, the mirror is placed in its frame, as seen in the drawing, and the silvered side is covered with varnish or oiled paper, or with any suitable material to make it water-proof. This water-proof material may be applied before the mirror is placed in its frame.

C represents the varnish or other water-proof material. D is a coating of plaster-of-paris or gypsum, or similar material, combined with water or other liquid to render the material sufficiently thin and semi-liquid to run and fill all the inequalities of the surface, and to form a coat on the back of the mirror of sufficient thickness to protect the glass.

If it is desired to not have the mirror attached to the frame, it may be lifted from the frame before the gypsum has become hard, and replaced when the gypsum is dry. Otherwise, the mirror is allowed to remain, and the gypsum to harden within the frame.

The advantages claimed are, that the mirror plate and frame will be strengthened, the silver will be protected from injury, and the wooden back board or other back and the wedging of the plate will be dispensed with.

Having thus described my invention, I claim as new and desire to secure by Letters Patent—

As a new article of manufacture, a mirror having a water-proof rear face, and over this a cement back, as and for the purpose described.

ALLEN HUBER.

Witnesses:
M. C. SCHOFIELD,
H. MILLER ANDREWS.